(12) United States Patent
Bodtländer et al.

(10) Patent No.: US 8,556,317 B2
(45) Date of Patent: Oct. 15, 2013

(54) GRIPPER FOR RETAINING CONTAINERS SUCH AS PET BOTTLES

(75) Inventors: Renate Bodtländer, Guldental (DE); Anke Moser, Merxheim (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 13/377,921

(22) PCT Filed: Jul. 8, 2010

(86) PCT No.: PCT/EP2010/004164
§ 371 (c)(1),
(2), (4) Date: Dec. 13, 2011

(87) PCT Pub. No.: WO2011/023260
PCT Pub. Date: Mar. 3, 2011

(65) Prior Publication Data
US 2012/0086229 A1 Apr. 12, 2012

(30) Foreign Application Priority Data
Aug. 31, 2009 (DE) .......................... 10 2009 038 988

(51) Int. Cl.
*B25J 15/08* (2006.01)
*B65G 47/86* (2006.01)

(52) U.S. Cl.
USPC ........................ 294/198; 198/803.7; 901/49

(58) Field of Classification Search
USPC ............... 294/192, 198, 65.5; 901/31, 36, 49; 198/803.3, 803.7, 803.9, 803.6
See application file for complete search history.

(56) References Cited

U.S. PATENT DOCUMENTS

| 4,786,769 | A | * | 11/1988 | Knasel et al. ............... 200/61.41 |
| 5,062,855 | A | * | 11/1991 | Rincoe .............................. 623/24 |
| 5,697,480 | A | * | 12/1997 | Herbermann et al. ...... 192/56.32 |
| 6,386,609 | B1 | | 5/2002 | Govzman |
| 7,784,603 | B2 | * | 8/2010 | Burgmeier ................. 198/472.1 |
| 8,128,142 | B2 | * | 3/2012 | Glotzl ........................... 294/116 |
| 2008/0272609 | A1 | | 11/2008 | Knieling et al. |
| 2011/0180374 | A1 | * | 7/2011 | Fahldieck ..................... 198/617 |

FOREIGN PATENT DOCUMENTS

| DE | 202005002924 | 3/2006 |
| DE | 102005014838 | 10/2006 |
| DE | 102005041929 | 3/2007 |
| WO | 2006/102983 | 10/2006 |

* cited by examiner

*Primary Examiner* — Dean Kramer
(74) *Attorney, Agent, or Firm* — Occhuitu Rohlicek & Tsao LLP

(57) ABSTRACT

A gripper for retaining containers includes gripper arms extending from corresponding rotation axes. Each gripper arm ends in a free claw and has a pair of permanent magnets. Adjacent poles of adjacent magnets have opposite polarities. The gripper also has a carrier plate for the gripper arms. This carrier plate has two pairs of permanent magnets oriented parallel to the rotation axes.

12 Claims, 5 Drawing Sheets

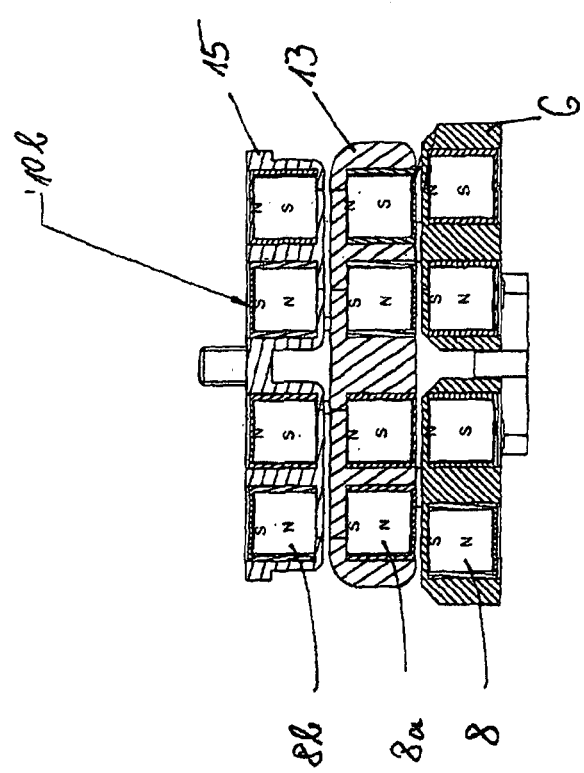

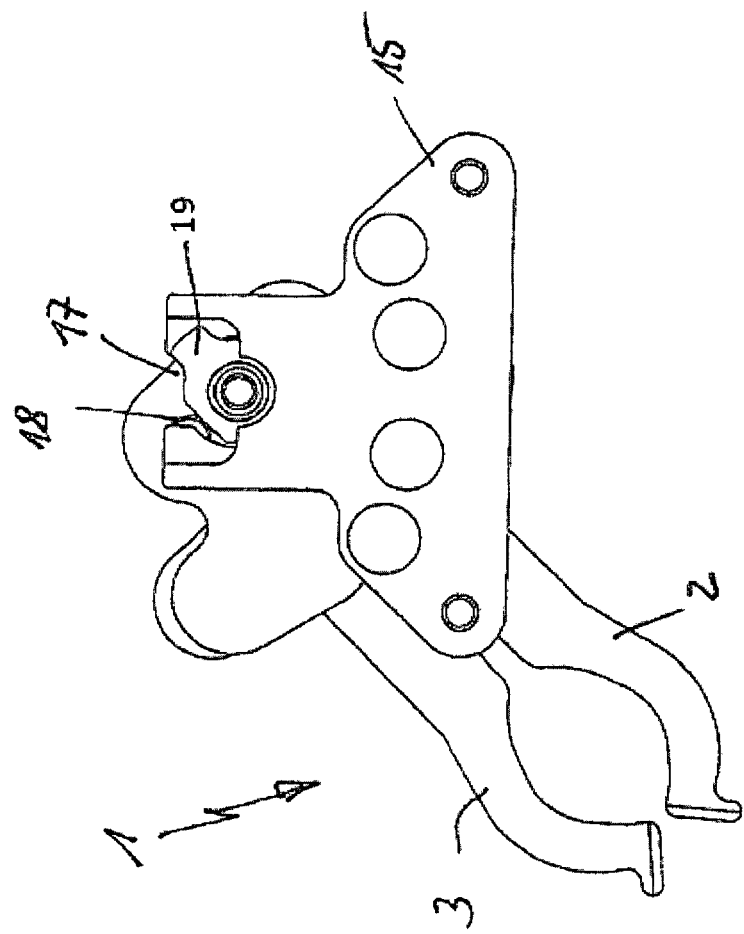

GRIPPER FOR RETAINING CONTAINERS SUCH AS PET BOTTLES

CROSS REFERENCE TO RELATED APPLICATIONS

This application is the national stage application of International Application No. PCT/EP2010/004164, filed Jul. 8, 2010, which claims priority to German application no. 10 2009 038 988.1, filed on Aug. 31, 2009. The contents are the foregoing applications are referenced herein in their entirety.

FIELD OF DISCLOSURE

The invention relates to a gripper for retaining containers such as PET bottles, wherein the gripper arms between the rotational axis and the free claw end and the carrier element for the gripper arms have receptacles for permanent magnets for closing and/or centering.

BACKGROUND

In the bottling plant sector which is of concern here, there is a series of gripper or holder solutions that make use inter alia of permanent magnet technology, in particular for applying closing forces. Reference is made in this context to DE 10 2005 041 929 A1, DE 10 2005 014 838 A1, DE 20 2005 002 924 U1 or U.S. Pat. No. 6,386,609 B1 by way of example only. Common to the prior art is that, as a rule, it is only the closing forces that are to be optimized by the magnets.

SUMMARY OF INVENTION

The object of the invention is to create a solution by means of which the closing forces will be applied by means of magnets and the centering of the grippers at a star or similar machine element or the protection against overloading will be reduced.

With a gripper of the kind indicated above, according to the invention, this object is resolved in that each gripper arm has a pair of permanent magnets and the carrier element has two associated pairs of permanent magnets oriented parallel to the rotational axis, each permanent magnet having a pole that is opposite that of the adjacent magnet in horizontal and/or vertical association.

What is achieved by the invention is that the bottle clamps are centered by the mutually attracting magnets, with repelling magnets being positioned on a further element, e.g. on a mounting part, so as to obtain a laterally elastic mounting of the complete gripper arm system. When a bottle is in the gripper, the force of the magnets ensures secure transport, with the centering of the grippers being achieved without any springs, making for a very hygienic design of the corresponding system.

Embodiments of the invention are given in the dependent claims. A further pivotable carrier plate having two further pairs of permanent magnets may be provided between the level of the magnets in the gripper arms and the magnets in the carrier element.

Further functions may be incorporated into the system by way of the interposed further pivotable carrier plate equipped with permanent magnets. Not only the centering of the gripper arms but also, as already mentioned above, the elastic mounting through repelling magnets. Further embodiments of the invention have all permanent magnets, which in the operating position are positioned essentially one above the other in the three levels, exhibit the same pole arrangement (e.g. N-S, N-S, N-S), while adjacent rows of magnets exhibit an opposite pole arrangement (e.g. S-N, S-N, S-N).

In embodiments of the invention, it is also proposed that the pivots of the gripper arms in the intermediate element and the pivot of the intermediate plate be fixed in the carrier plate or on the star.

A further advantage of the invention lies in the fact that if a significant lateral loading occurs, say as a result of a malfunction in the system, the grippers too can avoid the load without the need for return springs or similar elements. This can be effected by the overcoming of a mechanical lock with, if necessary, a corresponding return by the magnetic forces, as is also provided for by the invention.

One advantageous embodiment of the invention lies in the fact that each outer magnet of each magnet pair is arranged slightly offset radially relative to the associated outer magnet of another level so as to exert a centering force in the direction of the pivots of the gripper arms and/or of the intermediate plate.

In addition to the inventive gripper, the invention also provides a transport apparatus for PET bottles or other containers that can be held by grippers, said transport apparatus being characterised by the corresponding inventive grippers.

BRIEF DESCRIPTION OF THE DRAWINGS

Other attributes, details and advantages of the invention are indicated by the following description and by reference to the drawings, in which FIG. 4 is a cross-section through an inventive gripper on the level determined by the permanent magnets, and FIG. 5 is the depiction of FIG. 1 in a plan view of the gripper in the lowered position caused by a possible fault.

DETAILED DESCRIPTION

Figure 1:
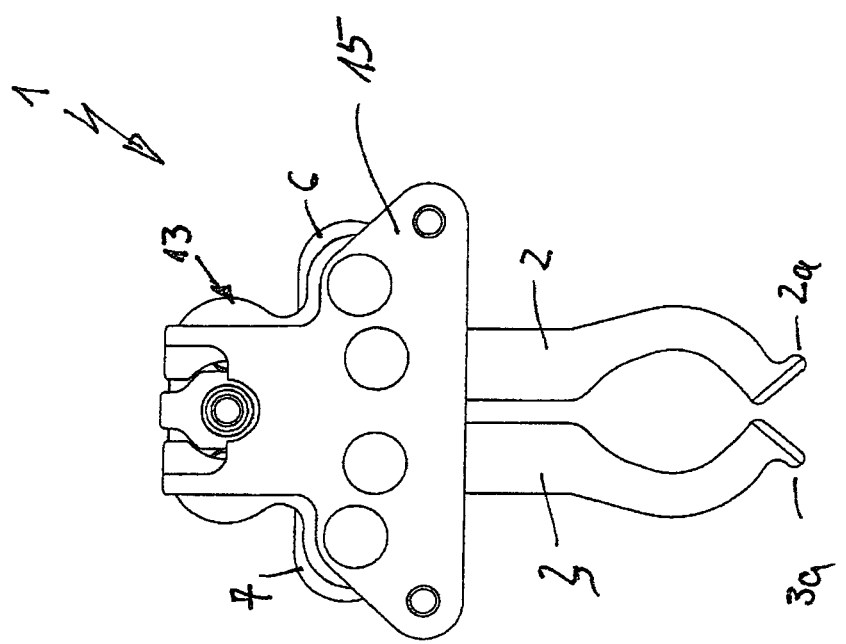
FIG. 1 is a view of an inventive gripper.

The gripper that is generally indicated in the figures by 1 for the retaining and gripping of PET bottles for example—this not being depicted in the figures—exhibits two gripper arms 2 and 3 that are each pivotable about a pivot 4 and 5 and that, in the depicted example are positioned between these pivots 4 and 5 and claw ends 2a and 3a and shoulders 6, 7 of grippers 2 and 3, each of which is equipped with one pair of permanent magnets, the permanent magnets being set in sleeves in the respectively corresponding plastic body.

For the easier description of the permanent magnets, which as the further description shall show are arranged on different levels, the latter are depicted on one level by 8, 9, 10 and 11 and on another level by the addition of letter "a" or "b". The sleeves are all indicated by 12.

Figure 2:
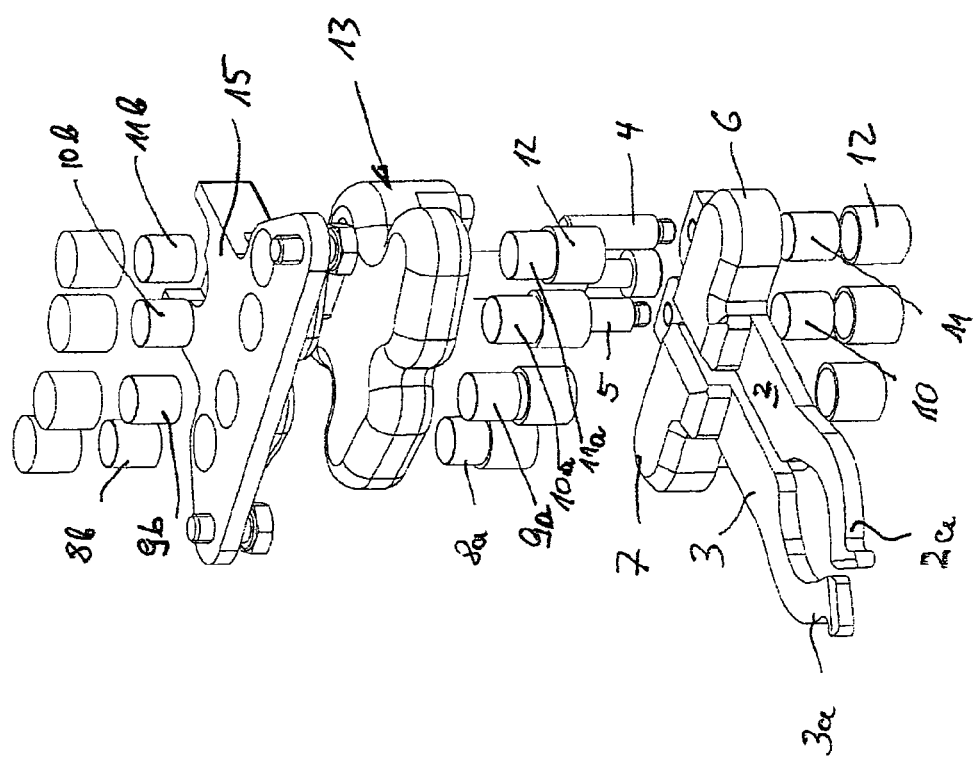
FIGS. 2 and 3 are exploded depictions of the inventive gripper in different views.
Figure 3:
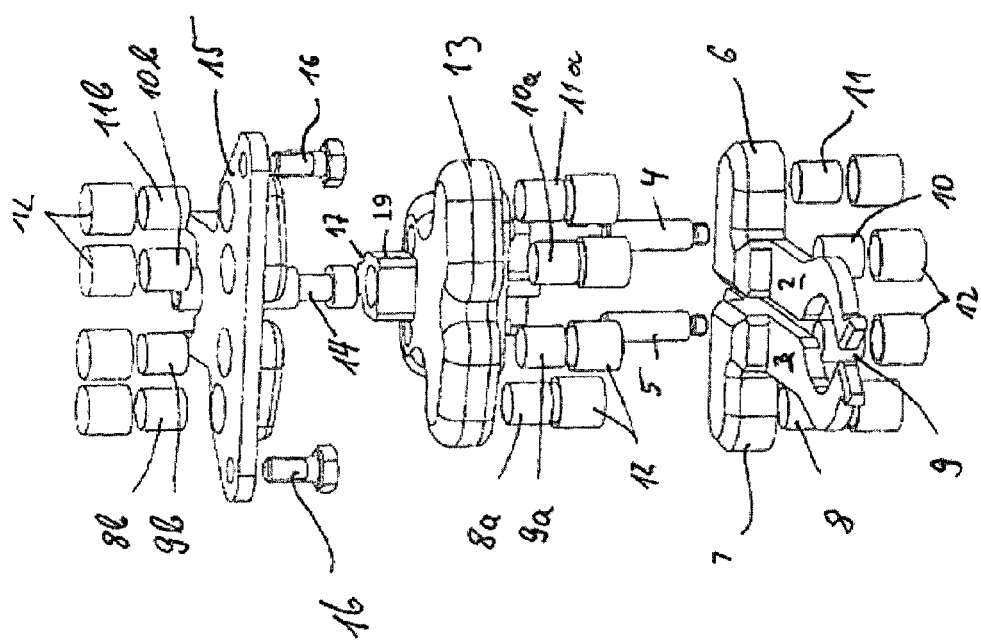

As FIGS. 2 and 3 in particular show, pivots 4 and 5 are screwed into a further pivotable carrier plate generally indicated by 13, which is in turn pivotably attached by means of rotational axis 14 to a carrier plate 15, which is in turn attached by screws 16 to a further machine element not otherwise shown in the figures, e.g. a star or similar machine element. Pivot 14 of intermediate element 13 can be attached either to a carrier plate 15 or to the respective machine element, which is not otherwise shown in the figures.

Intermediate element 13 exhibits a moulded-on cam 19 with through holes that has lateral locking indentations 17 that interact with a detent body 18 e.g. on the carrier plate 15, in such a way that if a certain lateral force is exceeded, gripper 1, at its operating position or working position shown in FIG. 1, is swung into the force-avoiding position depicted in FIG. 5.

The pole arrangement of the individual is shown in FIG. 4. Consequently the magnets lying one above the other positioned in a row, e.g. magnets 8, 8*a* and 8*b*, exhibit the same pole arrangement in such a way that the adjacent magnets attract while the magnets arranged side by side in a horizontal level exhibit respectively alternating pole arrangement or pole alignment.

The described embodiment of the invention can of course be modified in many different respects without departing from the basic idea. Consequently the invention is not limited to the geometrical design of the components carrying the magnets or to the manner of centering and so forth.

The invention claimed is:

1. A gripper for retaining containers, said gripper comprising: gripper arms extending from corresponding rotation axes, each gripper arm ending in a free claw and having a pair of permanent magnets, wherein adjacent poles of adjacent magnets have opposite polarities, and a carrier plate for the gripper arms, the carrier plate having two pairs of permanent magnets oriented parallel to the rotation axes.

2. The gripper of claim 1, further comprising a pivotable intermediate plate having two further pairs of magnets, the plate being disposed between the magnets of the gripper arm and the magnets of the carrier plate.

3. The gripper of claim 2, wherein the magnets associated with the gripper arm, the magnets associated with the carrier plate, and the magnets associated with the intermediate plate define three levels of magnets, and wherein magnets in adjacent levels are oriented with opposite polarity.

4. The gripper of claim 3, wherein an outer magnet of a magnet pair in one level is radially offset relative to an associated outer magnet of a magnet pair in an adjacent level, thereby exerting a centering force on one of the pair of gripper arms and the carrier plate.

5. The gripper of claim 2, wherein the gripper arms each comprise a pivot fixed to the intermediate plate, and wherein the intermediate plate comprises a pivot arm fixed to one of the carrier plate and a star.

6. The gripper of claim 2, further comprising a mechanical locking or clamping arrangement for positioning the gripper arms and the intermediate plate, the arrangement being configured to release in response to lateral overload and to permit pivoting the gripper arms to swing into a force avoiding position.

7. A container transport apparatus, said apparatus comprising: gripper arms extending from corresponding rotation axes, each gripper arm ending in a free claw and having a pair of permanent magnets, wherein adjacent poles of adjacent magnets have opposite polarities, and a carrier plate for the gripper arms, the carrier plate having two pairs of permanent magnets oriented parallel to the rotation axes.

8. The apparatus of claim 7, further comprising a pivotable intermediate plate having two further pairs of magnets, the plate being disposed between the magnets of the gripper arm and the magnets of the carrier plate.

9. The apparatus of claim 8, wherein the magnets associated with the gripper arm, the magnets associated with the carrier plate, and the magnets associated with the intermediate plate define three levels of magnets, and wherein magnets in adjacent levels are oriented with opposite polarity.

10. The apparatus of claim 9, wherein an outer magnet of a magnet pair in one level is radially offset relative to an associated outer magnet of a magnet pair in an adjacent level, thereby exerting a centering force on one of the pair of gripper arms and the carrier plate.

11. The apparatus of claim 8, wherein the gripper arms each comprise a pivot fixed to the intermediate plate, and wherein the intermediate plate comprises a pivot arm fixed to one of the carrier plate and a star.

12. The apparatus of claim 8, further comprising a mechanical locking or clamping arrangement for positioning the gripper arms and the intermediate plate, the arrangement being configured to release in response to lateral overload and to permit pivoting the gripper arms to swing into a force avoiding position.

* * * * *